United States Patent Office 2,911,377
Patented Nov. 3, 1959

2,911,377

PROCESS FOR THE POLYMERIZATION OF OLEFIN OXIDES

Arthur E. Gurgiolo, Lake Jackson, Tex., and Harvey D. Ledbetter, Walnut Creek, Calif., assignors to The Dow Chemical Company, Midland, Mich., a corporation of Delaware No Drawing. Application August 7, 1958
Serial No. 753,635

12 Claims. (Cl. 260—2)

This invention relates to a process for the polymerization of olefin oxides, particularly propylene oxide, to solid polymeric material under the catalytic influence of the certain cobaltous and manganous organic acid salts.

While numerous catalysts have been known to be effective in the polymerization of olefin oxides to solid polymers, only certain ferric compounds, such as disclosed in U.S. Patent Nos. 2,706,182 and 2,706,189, have been effective in the polymerization of propylene oxide to a solid polymer. By employing the catalyst under the methods disclosed in the above cited patents solid polymers of propylene oxide and copolymers of propylene oxide with other alkylene oxides are obtained. These polymers are colorless to white resinous products with considerable crystallinity. In using catalyst in the polymerization and copolymerization of olefin oxides, a portion of the catalyst becomes associated or entrapped within the polymer during the polymerization. Catalysts which have a pronounced color thus impart a color to the polymers and must be removed, especially where colorless or white resinous products are desired. Since the certain ferric compounds as disclosed in the above cited patents are the only heretofore known catalysts which were effective in producing solid polymers of propylene oxide, the polymers obtained with this catalyst have to be purified to substantially remove all of the residual catalyst from the polymer to prevent discoloration of the resin. It would be greatly desirable to have a non-ferrous catalyst which when small amounts are associated with the polymer would not impart a substantial color to the resin.

It is, therefore, one of the principal objects of this invention to provide a process for the production of solid polymer of olefin oxide employing a catalyst whose presence in the polymer will not have substantial effect upon the color of the polymer. A further object is to provide a catalyst which is effective in polymerizing propylene oxide to solid polymers.

The above and additional objects are attained by polymerizing olefin oxides to solid polymeric materials by employing a cobaltous or a manganous salt of a mono- or polycarboxylic acids, such as aliphatic mono-, di-, and tricarboxylic acids having from 2 to 30 carbon atoms and aromatic mono- and dicarboxylic acids having up to 3 aromatic rings. Illustrative examples of the salts that may be used are the cobaltous and manganous salts of naphthoic, benzoic, naphthalic, phthalic, acetic, propionic, butyric, capric, stearic, oelic, caproic, caprylic, lauric, palmitic, myristic, octoic, acrylic, crotonic, oxalic, malonic, pimelic, maleic, citric, and tricarballylic acids. The salts of aliphatic carboxylic acids having from 2 to 20 carbon atoms are generally preferred.

The amount of catalyst that is employed is ordinarily between from 1 to 6 percent by weight, based on the weight of the oxide monomer or monomers being polymerized. Preferably an amount of the catalyst in the neighborhood of 4 percent by weight is utilized. The employment of the preferred amount of catalyst for accomplishing the polymerization ordinarily secures optimum rates of reaction or complete conversion of the monomer to the solid polymer.

The polymeric materials that may be obtained by practice of the invention are solid substances that have at least one and usually more of a variety of uses including the preparation of moldings, films, fibers and in coating applications. They generally provide high tensile strength fabricated articles that are possessed of good dielectric characteristics. Propylene oxide, for example may frequently be completely or substantially completely converted by the present method to a white solid crystalline polymeric material that may have an average molecular weight in excess of 100,000, and a melting point that may be greater than 50° C. The homopolymers of propylene oxide and copolymers of propylene oxide with other olefin oxides which may be obtained are essentially similar to those which have been delineated in the specification of U.S. Patent No. 2,706,189.

In the polymerization of the propylene oxide and the other olefin oxides, the monomer or monomers and the catalyst may be simply mixed together and charged into a closed vessel and heated until the polymerization is complete. It is usually beneficial for the reaction mass to be agitated during the polymerization. Temperatures in the range of about 30° to 150° C. may be used. At the lower temperatures, higher yield of the solid polymer may be realized but the polymerization time is generally longer and may often be 200 hours or more. At the high temperatures, the rate of reaction is relatively rapid and a suitable point for the termination of the reaction may be reached in less than 3 hours. However, at these high temperatures, the yield of the solid resin obtained may decrease. In order to obtain a fairly rapid rate of reaction with a suitable yield of the desired solid polymer, the polymerization is ordinarily carried out at a temperature between 80° and 130° C. At a temperature of 80° C. to 130° C., the polymerization usually is substantially completed in about 18 to 120 hours, the optimum being from 40 to 60 hours.

The polymerization may also be carried out in a suitable inert non-aqueous diluent medium. The employment of such a medium for the polymerization may sometimes tend to reduce the rate of the reaction, although, in certain instances, it may facilitate the achievement of a more nearly complete copolymerization of the monomer or monomers. The medium either may be a solvent or a non-solvent suspending medium. It is advantageous for the diluent medium that is employed to boil at about the desired polymerization temperature. In this way, the utilization of reflux techniques permits an easy means for the regulation of the reaction temperature. Diethyl ether, diisopropyl ether, petroleum ether, benzene, n-hexane and the like provide beneficial solvent characteristics for employment in the polymerization. While various low boiling, liquid, non-solvent media may also be employed, it is usually more desirable to utilize solvents. The inert non-aqueous diluent medium may generally be used in a quantity that is approximately equal to the quantity of the monomers being so polymerized.

The polymeric product may be recovered and purified from the reaction mass according to several procedures apparent to those skilled in the art. For example, the unreacted monomers and the solvent or other diluent medium (when one has been employed) may be stripped from the reaction mass by vaporization to leave the polymeric material. The crude polymer is in the form of a tough, rubber-like to a wax-like solid which may be associated with liquid polymers that may have been formed during the reaction. Usually the impure polymer may be dissolved in a suitable solvent, such as hot acetone, and precipitated or crystallized from the solution by cooling the solution to a low temperature, generally about −20° C. or below. Recrystallization may be employed for further purification until a suitable solid polymeric material is obtained that has a sufficiently high molecular weight to not soften excepting at temperatures that are in excess of about 50° C. The major portions of the catalyst incorporated with the polymer may be removed by acidifying the acetone solution of the polymer with hydrohalide acids, such as hydrochloric acid, to convert the catalyst to a soluble colorless form prior to crystallization of the polymer. Since the catalyst will not materially affect the color of the polymer after acidification, complete removal is not necessary.

By the process of the invention, polymers of other olefin oxides besides propylene oxide may also be prepared. Solid polymers of such lower olefin oxides as ethylene oxide, chloropropylene oxide, which is also known as epichlorohydrin, isobutylene oxide and others that contain not more than four carbon atoms in their molecules may also be obtained. In addition, copolymers of propylene oxide with other organic epoxides which may be used in amounts comprising up to about equal proportions by weight of the latter with the propylene oxide may also be prepared by practice of the invention. Thus, copolymers of propylene oxide with another olefin oxide selected from the group consisting of ethylene oxide, chloropropylene oxide, isobutylene oxide, 1,2-epoxybutane and the isomeric 2,3-epoxybutane, styrene oxide, and mixtures thereof may readily be obtained.

The invention is further illustrated by the following examples but is not to be construed as limited thereto.

*Example I*

To a stainless steel bomb, 25 grams of propylene oxide and 1 gram of cobaltous naphthenate were added. The bomb was closed and inserted in a cage attached to a paddle revolving through 360° in a water bath which was maintained at 80° C. The propylene oxide and the catalyst thus charged in the bomb were agitated and heated to a temperature of 80° C. for a period of about 24 hours after which the bomb was cooled, opened, and the contents placed under vacuum to evaporate the unreacted propylene oxide. A white waxy crude product of approximately 24 grams was obtained. The crude product so obtained was purified by dissolving the product in hot acetone. A clear, slightly yellow, solution of the crude product in acetone was obtained to which concentrated hydrochloric acid was added until the solution became clear and colorless. The solution was then cooled to −20° C. and the polymer crystallized out. Upon crystallization, approximately 6 grams of a hard, elastic polymer were obtained. When the polymer so obtained was molded into a film it had a tensile strength of 5800 pounds per square inch.

*Example II*

In the equipment and manner described in Example I, propylene oxide was polymerized in the presence of manganous naphthenate as a catalyst.

To the stainless steel bomb, 25 grams of propylene oxide and 1 gram of manganous naphthenate were added. The polymerization was carried out at 80° C. for a reaction period of 140 hours. Approximately 20 grams of a crude polymer were obtained which when purified in the manner described in Example I yielded approximately 1.2 grams of a white resin.

The above run was repeated except that manganous stearate was used as a catalyst and a reaction time of 160 hours was employed. Approximately 11.5 grams of a crude polymer were obtained which upon purification gave 1.1 grams of a white polymer.

*Example III*

A series of runs was made where ethylene oxide was polymerized using cobaltous and manganous salts. In each run, a glass vial, 1 inch in diameter and 5 inches in length, was used as the reactor. The vial was first purged with nitrogen and then 0.15 gram of the catalyst and 15 grams of ethylene oxide were added. The vial containing the catalyst and ethylene oxide was then chilled in a Dry Ice-acetone bath and sealed.

After allowing the vial to come to room temperature, it was placed in a rotated steam heated autoclave where it was heated to 130° C. and maintained at that temperature for a predetermined reaction time. After the reaction time, the vial was opened and the ethylene oxide vaporized leaving the polymer. The polymer remaining was weighed to determine the percent of the ethylene oxide converted to the polymer.

The polymers obtained were white plastic solids which could be molded into a white film which became oriented by stretching.

The pertinent data and conversions obtained are shown in the table below.

| Catalyst used | Reaction time | Polymer obtained, grams | Conversion of ethylene oxide, percent |
| --- | --- | --- | --- |
| Manganous stearate | 58 | 7.5 | 50 |
| Do | | 12.0 | 80 |
| Cobaltous acetate | 72 | 13.6 | 91 |

In the manner described above, solid polymers of lower olefin oxides, such as chloropropylene oxide, butylene oxide, isobutylene oxide and others that contain not more than 4 carbon atoms in their molecule may be prepared by substituting the respective olefin oxide for propylene oxide or ethylene oxide. Also copolymers of propylene oxide with another olefin oxide up to about equal proportion of weight of the latter with the propylene oxide may likewise be prepared.

What is claimed is:

1. A process for the polymerization of a lower olefin oxide containing not more than 4 carbon atoms in its molecule to form solid polymeric materials, which comprises mixing the olefin oxide with from 1 to 6 weight percent of a catalyst selected from the group consisting of cobaltous and manganous salts of aliphatic mono- and polycarboxylic acids having from 2 to 30 carbon atoms and aromatic mono- and dicarboxylic acids having up to 3 aromatic rings, heating the resulting mixture to a temperature of from 30° to 150° C. for a period of time sufficient to polymerize the olefin oxide, and separating the solid polymermic material from the reaction mass.

2. A process according to claim 1 wherein the olefin oxide is propylene oxide.

3. A process according to claim 1 wherein the olefin oxide is ethylene oxide.

4. A process for the polymerization of propylene oxide to a solid polymeric material, which comprises mixing the propylene oxide with from 1 to 6 weight percent of cobaltous acetate as catalyst, heating the resulting mixture to a temperature of from 30° to 150° C. for a period of time sufficient to polymerize the olefin oxide, and separating the solid polymeric material from the reaction mass.

5. A process for the polymerization of propylene oxide to a solid polymeric material, which comprises mixing the propylene oxide with 4 weight percent of cobaltous acetate, heating the resulting mixture to a temperature of from 80° C. to 130° C. for a time of from 18 to 120 hours, and separating the solid polymeric material from the reaction mass.

6. A process for the polymerization of propylene oxide to a solid polymeric material, which comprises mixing the propylene oxide with from 1 to 6 weight percent of manganous stearate catalyst, heating the resulting mixture to a temperature of from 30° to 150° C. for a period of time sufficient to polymerize the olefin oxide, and separating the solid polymeric material from the reaction mass.

7. A process for the polymermization of propylene oxide to solid polymeric material, which comprises mixing the propylene oxide with 4 weight percent of manganous stearate, heating the resulting mixture to a temperature of from 80° C. to 130° C. for a time of from 18 to 120 hours, and separating the solid polymeric material from the reaction mass.

8. A process for the polymerization of ethylene oxide to solid polymeric material, which comprises mixing the ethylene oxide with from 1 to 6 weight percent of cobaltous acetate as catalyst, heating the resulting mixture to a temperature of from 30° to 150° C. for a period of time sufficient to polymerize the olefin oxide, and separating the solid polymeric material from the reaction mass.

9. A process for the polymerization of ethylene oxide to a solid polymeric material, which comprises mixing the ethylene oxide with 4 weight percent of cobaltous acetate, heating the resulting mixture to a temperature of from 80° C. to 130° C. for a time of from 18 to 120 hours, and separating the solid polymeric material from the reaction mass.

10. A process for the polymerization of ethylene oxide to a solid polymeric material, which comprises mixing the olefin oxide with from 1 to 6 weight percent of manganese stearate, heating the resulting mixture to a temperature of from 30° to 150° C. for a period of time sufficient to polymerize the olefin oxide, and separating the solid polymeric material from the reaction mass.

11. A process for the polymerization of ethylene oxide to a solid polymeric material, which comprises mixing the ethylene oxide with 4 weight percent of manganous stearate, heating the resulting mixture to a temperature of from 80° C. to 130° C. for a time of from 18 to 120 hours, and separating the solid polymeric material from the reaction mass.

12. A process for the copolymerization of propylene oxide with an amount up to an equal proportion by weight of another olefin oxide selected from the group consisting of ethylene oxide, chloropropylene oxide, isobutylene oxide, 1,2-butylene oxide, the isomeric 2,3-butylene oxides, styrene oxide, and mixture thereof to form a solid copolymeric material, which comprises mixing the monomeric oxides with from 1 to 6 weight percent, based upon the weight of the oxides, of a catalyst selected from the group consisting of cobaltous and manganous salts of aliphatic mono- and polycarboxylic acids having from 2 to 30 carbon atoms and aromatic mono- and dicarboxylic acids having up to 3 aromatic rings, heating the resulting mixture to a temperature of from 80° to 130° C. for a period of time sufficient to copolymerize substantially all of the oxides, and separating the solid copolymeric material from the reaction mass.

No references cited.